March 7, 1961   P. C. WOLF   2,973,937
COOLING STRUCTURE
Filed March 31, 1958

INVENTOR.
PHILIP C. WOLF
BY John F. Cullen
ATTORNEY

United States Patent Office
2,973,937
Patented Mar. 7, 1961

2,973,937

COOLING STRUCTURE

Philip C. Wolf, Cincinnati, Ohio, assignor to General Electric Company, a corporation of New York Filed Mar. 31, 1958, Ser. No. 725,098

6 Claims. (Cl. 253—39.15)

The present invention relates to a cooling structure and more particularly, to a cooling arrangement for rotating members wherein the members are cooled five or six times more effectively than by conventional methods now known.

The present invention is directed toward the cooling of turbine wheels such as may be found in gas turbine engines. This application is merely used for illustration since it is obvious in the teaching of the invention that it may have application elsewhere when cooling problems are present in similar applications. It is well known that the efficiency of heat engines, such as gas turbine engines, can be increased by operation at higher temperatures. One of the main drawbacks to such operation, is the inability of the available metals to withstand the temperatures desired. Consequently, cooling forms an effective means of extending the upper operational limit of heat engines. Many schemes have been devised to cool various components of heat engines, such as gas turbine engines, which have been successful and are, in many cases, responsible for the successful operation of present day engines.

One of the main components of gas turbine engines which has imposed a limiting factor on the temperature range of the engine, is the turbine wheel itself. Many proposals have been offered to cool the turbine wheel and substantitally all turbine wheels in gas turbine engines in operation today are cooled in one form or another. One common method of cooling turbine wheels is to inject cooling air at the center or along the turbine wheel and let it pass radially outwardly along the wheel surface. This cooling method is quite commonly used, but suffers in that the rate of heat transfer is very low. Consequently, large quantities of air are required which are not always available nor desirable in an application of this kind. A rotating member, such as a turbine wheel disc, centrifuges the air radially outwardly, and builds up a boundary layer that adheres to the surface of the rotating disc. An inherent characteristic of such a system is this build-up of a boundary layer in the radial direction along the wheel surface. The heat transfer capability is thus very small. Thus, the cooling effect of the air passing over the surface of the wheel is inhibited by the boundary layer on the wheel surface which acts to decrease the rate of heat transfer.

The main object of the present invention is to provide a cooling system that utilizes structure to increase the heat transfer rate and, consequently, the cooling capabilities in an application such as the abovementioned turbine wheel.

A further object is to provide structure which is capable of cooling the rotating member or wheel much more efficiently by permitting a high heat transfer rate as compared to known methods.

Another object of the present invention is to provide structure which effectively removes the boundary layer air from the rotating member to provide a high relative velocity between the disc and the cooling fluid giving a high rate of heat transfer.

Briefly stated, my invention consists of providing a plenum chamber for a cooling fluid supply disposed closely adjacent the rotating member. The cooling fluid is directed against the surface of the rotating member through one or more nozzles spaced closely adjacent the rotating surface to impinge the cooling fluid against the wheel surface and provide a scrubbing action to remove the boundary layer on the surface of the wheel and give a high relative velocity between the cooling air and the rotating surface. Preferably, the impinging jets are directed at an angle perpendicularly to the wheel or rotating surface and at any other suitable angle in which the impinging jet has a component directed radially inwardly but not radially outwardly.

While the specification concludes with claims particularly pointing out and distinctly claiming the subject matter which I regard as my invention, it is believed the invention will be better understood from the following description taken in connection with the accompanying drawing in which:

Figure 1:
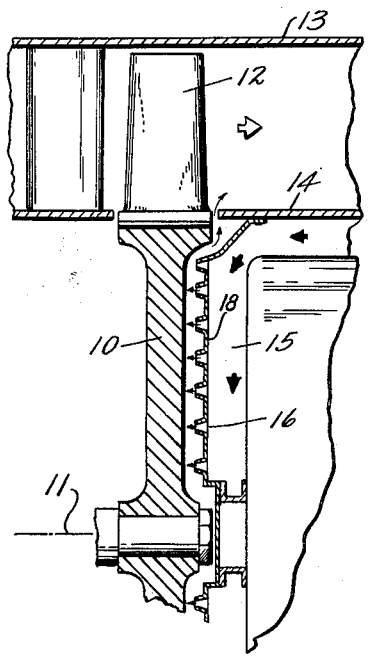
Figure 1 is a partial cross-sectional view illustrating the present invention with a plurality of nozzles.

For purposes of convenience, the present invention is described in connection with a turbine wheel and the cooling thereof, although it will be appreciated that the concept of the invention is applicable to any cooling arrangement for hot rotating elements. One common method of cooling the structure such as the turbine wheel shown in Figure 1, is by the introduction of cooling air generally at the center of rotation to allow it to pass radially outwardly along the surface of the wheel and provide cooling. Alternately, the air may be introduced at other than the center of rotation for the same purpose. However, as pointed out above, the rate of heat transfer by this method of cooling is very low. With this in mind, the present invention employs a rotating member such as turbine wheel 10 which turns about a central axis 11. The exhaust gases from the combustion area pass through the turbine bucket 12 and drive the turbine all in the conventional manner. The exhaust gases are confined to the passage defined by casing 13 and wall 14. The structure thus far described is conventional and is found in most gas turbine powerplants.

Due to the high temperature of the exhaust gases, the wheel 10 operates at a high temperature and must be cooled. The temperature may vary with the greatest heat concentration being near the rim of the wheel in the area of the connection of bucket 12 to the wheel. This is generally the high heat area although not necessarily so since it may vary depending on the particular installation. In order to cool the wheel effectively and at a high rate of heat transfer and thus with less cooling fluid, I provide a plenum chamber or manifold 15 which may take any suitable shape to conform to the surroundings in which it is placed and has a wall surface 18 closely adjacent wheel 10. As shown, the chamber may have an annular shape the depth of the annulus depending upon the quantity of cooling fluid required. Preferably, the chamber 15 is stationary since this is a convenient way to mount it. However, if desired, within the teaching of the invention it might also be movable although for general purposes, it is preferably stationary in which case it may be supported by the wall 14 as schematically shown.

To cool the wheel, the cooling fluid is directed from chamber 15 to the surface of wheel 10 by one or more converging nozzles 16 which are spaced closely adjacent the surface to be cooled and operate to change the velocity and pressure of the fluid passing therethrough to exhaust it as a high velocity jet. A high velocity jet issuing from the nozzle 16 performs a scrubbing action on the surface of the wheel to remove or interfere with the boundary layer that normally is centrifuged by the wheel and clings to the surface during rotation to provide an insulating barrier to effective cooling. The words "closely adjacent" are intended to include any arrangement wherein the jet formed by the nozzle may perform this scrubbing action. It is this scrubbing action which destroys the boundary layer and permits a high relative motion between the incoming cooling fluid and the rotating disc to provide a high rate of heat transfer. It can be seen that the action of the high velocity jet will create a swirl-like movement adjacent the nozzle exit at the wheel surface to recirculate and scrub the surface of the wheel and permit absorption of the heat and thus better heat transfer.

Figure 2:
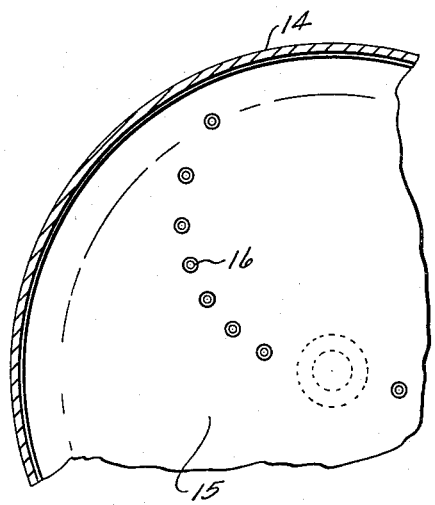
Figure 2 is an elevational view of the plenum chamber illustrating a nozzle arrangement such as may be used in Figure 1; and, Figure 3 is a partial cross-sectional view illustrating a different plenum chamber and nozzle arrangement.

As shown in Figure 2, the individual nozzles 16 may be radially arranged in a suitable fashion such as in a spiral to provide overlap of the jet effluxes on all surfaces of the cooled wheel 10. Thus, the complete boundary layer is removed from the entire surface of the wheel to be cooled by the particular arrangement shown in Figure 2. Thus, the radially and spirally disposed nozzles shown in Figure 2 are at different radial distances in a spiral configuration to insure the complete scrubbing action.

In some instances, it may not be necessary to cool the entire surface of the wheel and only part of the wheel may require cooling such as the periphery near the root portion of the bucket 12. If such is the case, a single nozzle may be employed of the type shown in Figure 3 as a complete annular nozzle 17 and may be used to issue a jet directly against the periphery of the whole wheel continuously. In such case, a plenum chamber of course will assume a suitable shape which may be that shown in Figure 3 and may be moveable or stationary.

Figure 3:
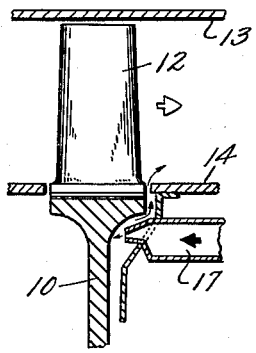

In order to obtain the most efficient scrubbing action and effective cooling, it is required that the issuing jet be directed in a suitable manner. This preferably consists of the jet being directed at an angle to the surface of the wheel to be cooled such that there is no radially outward component of the issuing jet. Thus, the jet may be directed perpendicularly to the surface of the wheel or may be directed in toward the center of the wheel and axis of rotation 11 as shown in Figures 1 and 3 respectively.

The structure thus described employing nozzles to provide the scrubbing action at the angles mentioned, has provided a heat transfer rate that is five to six times as great as that provided by the conventional means of merely allowing cooling fluid to enter and pass over the surface of the wheel.

While I have hereinbefore described the invention as applied to a particular application, it will be apparent that various changes may be made by those familiar with the art which will fall within the spirit and scope of the claims.

What I claim as new and desire to secure by Letters Patent of the United States is:

1. Cooling structure for a rotating member having a surface to be cooled comprising, a plenum chamber containing cooling fluid and including a wall closely adjacent the member surface, plural converging nozzle means in the wall directing the cooling fluid in a high velocity jet onto the member surface and providing a scrubbing action thereto, the axis of the jet being directed at the surface at an angle that provides no radially outward component.

2. Cooling structure for a rotating member having a surface to be cooled comprising, a plenum chamber containing cooling fluid and including a wall closely adjacent the member surface, a plurality of converging nozzles radially disposed in the wall directing the cooling fluid in a series of high velocity jets to impinge on the member surface at different radial positions and provide a scrubbing action thereto, the axis of each jet being directed at the surface at an angle that provides no radially outward component.

3. Cooling structure for a rotating member having a surface to be cooled, comprising a plenum chamber containing cooling fluid and including a wall closely adjacent the member surface, a plurality of converging nozzles radially and spirally disposed in the wall directing the cooling fluid in a series of high velocity jets to impinge on the member surface at different radial positions and provide a scrubbing action thereto, the axis of each jet being directed at the surface at an angle that provides no radially outward component.

4. Cooling structure for a rotating gas turbine wheel having a surface to be cooled comprising, a stationary plenum chamber containing cooling fluid and including a wall closely adjacent the wheel surface, plural converging nozzle means in the wall directing the cooling fluid in a high velocity jet to impinge on the member surface and provide a scrubbing action thereto, the axis of the jet being directed at the surface at an angle that provides no radially outward component.

5. Cooling structure for a rotating gas turbine wheel having a surface to be cooled comprising, a stationary plenum chamber containing cooling fluid and including a wall closely adjacent the wheel surface, a plurality of converging nozzles radially disposed in the wall directing the cooling fluid in a series of high velocity jets to impinge on the wheel surface at different radial positions and provide a scrubbing action thereto, the axis of each jet being directed at the surface at an angle that provides no radially outward component.

6. Cooling structure for a rotating gas turbine wheel having a surface to be cooled comprising, a stationary plenum chamber containing cooling fluid and including a wall closely adjacent the wheel surface, a plurality of converging nozzles radially and spirally disposed in the wall directing the cooling fluid in a series of high velocity jets to impinge on the wheel surface at different radial positions and provide a scrubbing action thereto, the axis of each jet being directed at the surface at an angle that provides no radially outwardly component.

References Cited in the file of this patent

UNITED STATES PATENTS

| | | |
|---|---|---|
| 2,234,792 | Allen | Mar. 11, 1941 |
| 2,364,037 | Smith | Nov. 28, 1944 |
| 2,372,467 | Alford | Mar. 27, 1945 |
| 2,620,123 | Parducci | Dec. 2, 1952 |
| 2,620,157 | Morley et al. | Dec. 2, 1952 |

FOREIGN PATENTS

| | | |
|---|---|---|
| 452,412 | Great Britain | Aug. 24, 1936 |
| 938,722 | France | Apr. 12, 1948 |